Oct. 11, 1938.   J. A. LOGAN   2,132,535
HOSE PULL CONTROL FOR LIQUID DISPENSING APPARATUS
Filed July 3, 1937   5 Sheets-Sheet 1

INVENTOR
JOSEPH A. LOGAN
BY
Chapin & Neal
ATTORNEYS

Oct. 11, 1938.  J. A. LOGAN  2,132,535
HOSE PULL CONTROL FOR LIQUID DISPENSING APPARATUS
Filed July 3, 1937  5 Sheets-Sheet 2

INVENTOR
JOSEPH A. LOGAN
BY
Chapin & Neal
ATTORNEYS

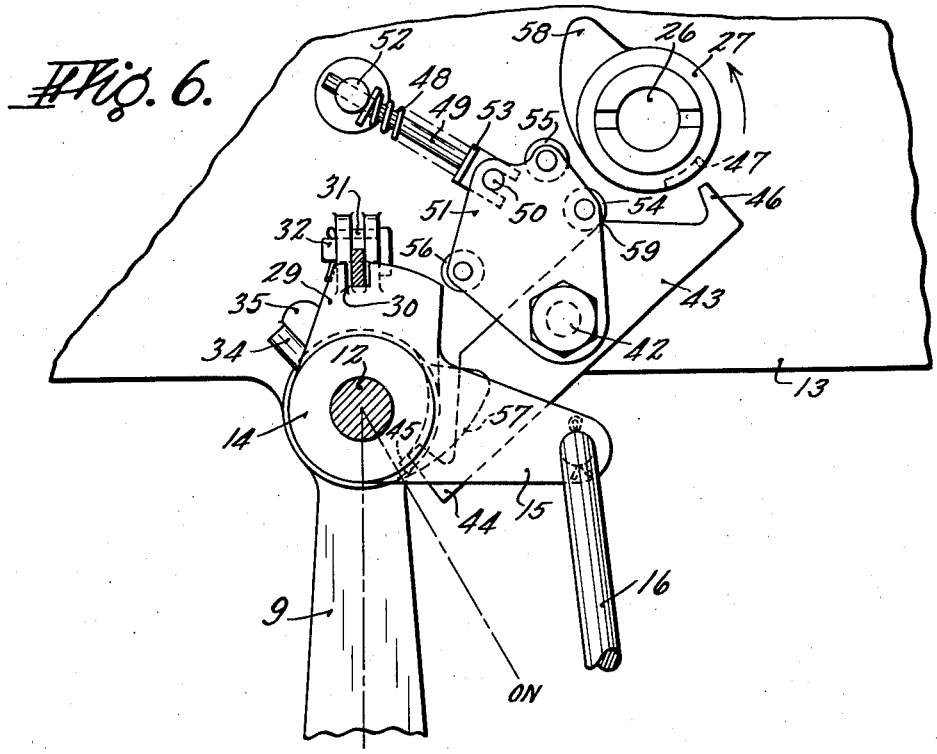

Oct. 11, 1938.   J. A. LOGAN   2,132,535
HOSE PULL CONTROL FOR LIQUID DISPENSING APPARATUS
Filed July 3, 1937   5 Sheets-Sheet 4
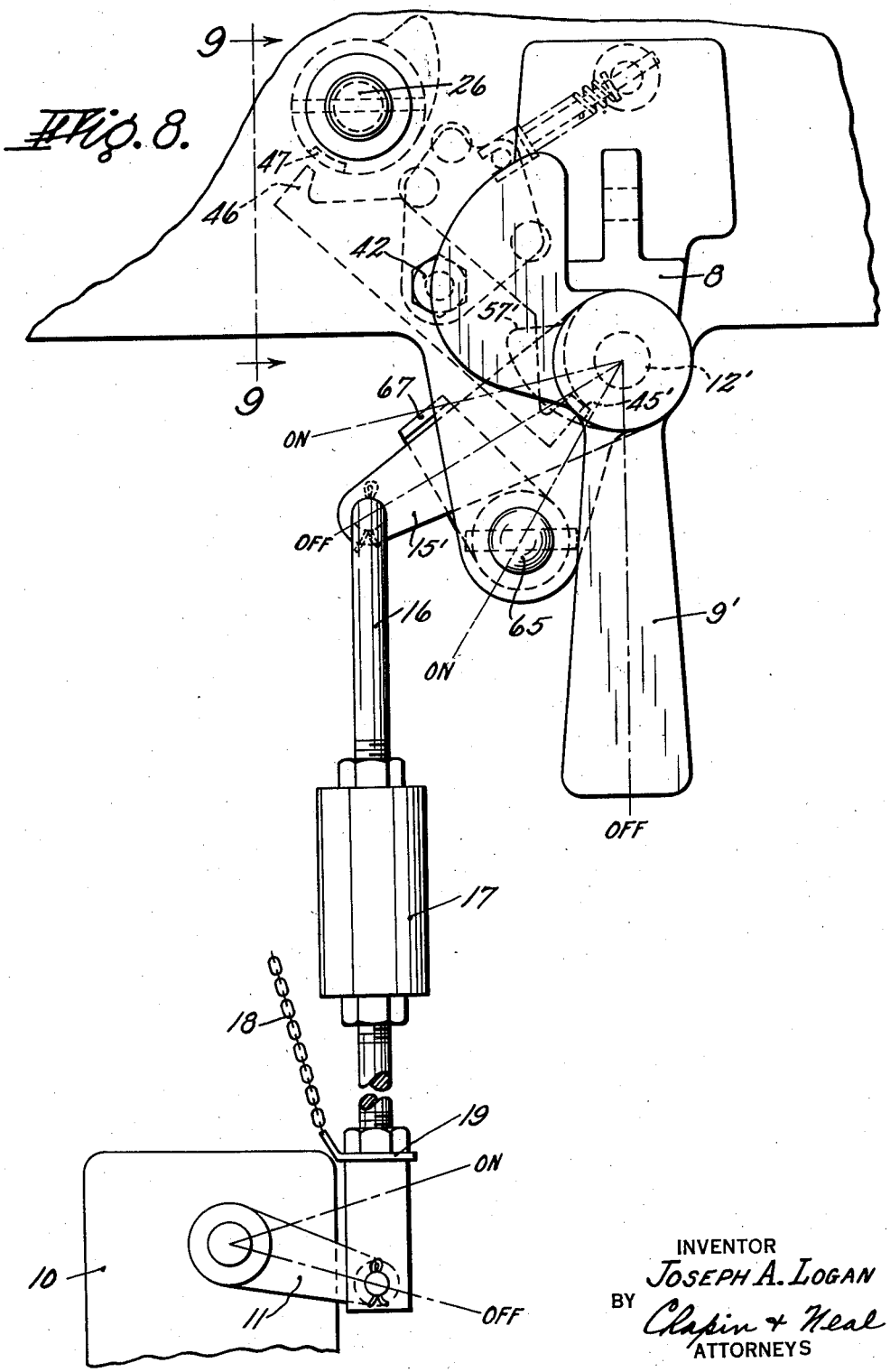
INVENTOR
JOSEPH A. LOGAN
BY Chapin + Neal
ATTORNEYS Oct. 11, 1938.                J. A. LOGAN                    2,132,535
          HOSE PULL CONTROL FOR LIQUID DISPENSING APPARATUS
                    Filed July 3, 1937        5 Sheets-Sheet 5

INVENTOR
JOSEPH A. LOGAN
BY Chapin & Neal
ATTORNEYS

Patented Oct. 11, 1938

2,132,535

UNITED STATES PATENT OFFICE 2,132,535

HOSE PULL CONTROL FOR LIQUID DISPENSING APPARATUS

Joseph A. Logan, Springfield, Mass., assignor to Gilbert & Barker Manufacturing Company, West Springfield, Mass., a corporation of Massachusetts Application July 3, 1937, Serial No. 151,859

8 Claims. (Cl. 221—95)

This invention relates to improvements in liquid dispensing apparatus of the type generally known as gasoline pumps and used for the sale and dispensing of gasoline.

A characteristic feature of such pumps is a meter register operated in accordance with the flow of dispensed gasoline and having an indicator for displaying to the customer the quantity of gasoline dispensed at each operation. In some instances the indicator display is in terms of money cost as well as quantity of the liquid dispensed. Such meter registers necessarily have some device or mechanism for resetting the indicator to zero known as zeroizing after each dispensing operation.

The means for establishing flow through the apparatus is usually an electric motor driven pump with a switch or controller for the motor to start and stop the flow but as far as the present invention is concerned the flow establishing means might be gravity or pressure and a valve controller for the flow. The dispensing element is a movable or flexible hose having a discharge nozzle and in the form of apparatus to which this invention particularly relates, the dispensing hose is so connected with the controller that a pull on the hose is required to start the flow and as soon as this pull is relaxed the flow stops. This arrangement is known in the art as the hose pull control.

The principal object of the present invention is to provide means in such an apparatus as above described which will impel or forcefully induce the pump attendant to reset or zeroize the register indicator before each new dispensing operation to a customer. It is not practical to compel the attendant to reset the indicator each time the pump is stopped because this would occur whenever the pull on the hose is relaxed and such a compulsory reset would become a nuisance in an ordinary dispensing operation. But it is customary for the attendant to hang up the hose after fully completing a dispensing operation and when this action occurs, the present invention comes into play for impelling or inducing the attendant to zeroize the indicator before attempting to start a new dispensing operation.

Further objects and particular advantages of the present improvement will become apparent from the following detailed description of the apparatus taken in connection with the accompanying drawings, in which Fig. 1 is a front elevation reduced in size of the dispensing apparatus with a portion of the front casing wall removed to show some of the interior parts;

Figs. 6 and 7 are similar sections along line 6—6 of Fig. 3, showing the interlock mechanism in two different positions;

Fig. 8 is a side view of a modified form of manual control handle and blocking member, also showing connections to the motor switch controller.

Figure 1:
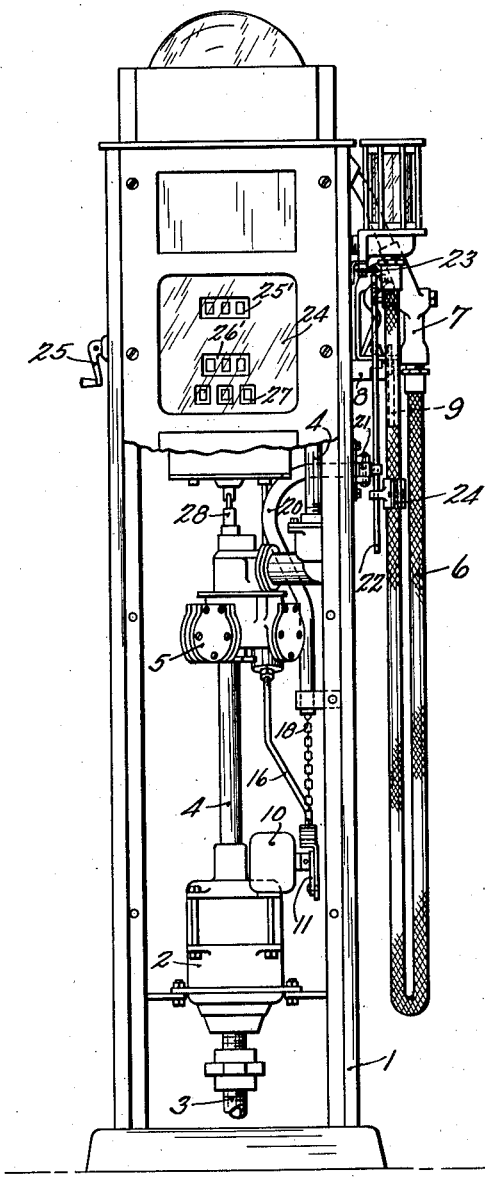
Figure 2:
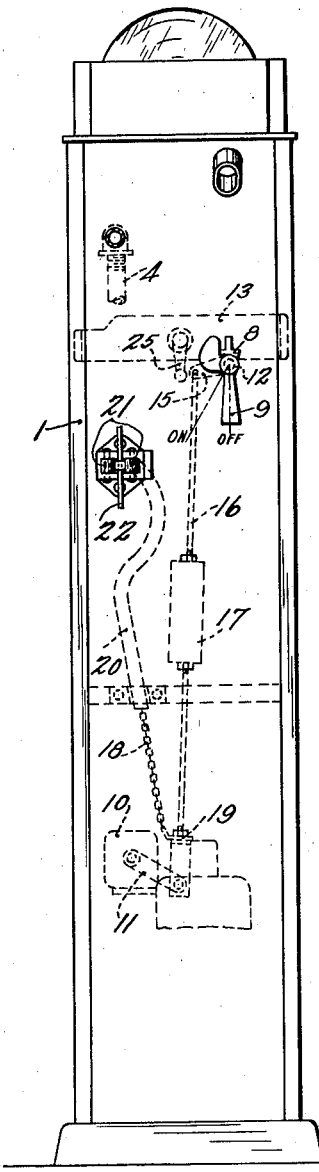
Fig. 2 is a right side elevation of the same, some of the exterior parts at this side being removed for clearness.

Referring more particularly to the drawings, the principal and well known parts of such apparatus are shown in Figs. 1 and 2 wherein the pump casing is indicated at 1, the combined motor and pump unit at 2, with its suction line at 3 and discharge line at 4. The discharge line 4 passes through the usual flow operated meter 5 and finally connects with the flexible dispensing hose 6 and its discharge nozzle 7. When not in use the nozzle 7 is hung on a fixed support 8 as shown. Pivotally mounted in said support 8 is the manual control handle 9 and the relation of the handle and said nozzle is such that the nozzle may not be hung on its support unless the handle is in off position and the handle may not be swung to on position unless the nozzle is removed from the support.

The main controlling switch for the motor 2 is in casing 10 and has its pivoted switch arm or controller 11 at one side thereof. In the down position of controller 11 the switch is off, and the flow is stopped; in its up position the switch is on and the flow is started and continues only so long as the controller remains in its up position. The manual control handle 9 is not connected to turn the switch 10 on or off but has another function as will be described. The handle 9 is fixed to a rotatable spindle 12 which extends in bearings through the support 8 and bracket 13 of which said support is a part, and upon the rear inner end of said spindle 12 (see Fig. 3) is loosely mounted for rockable rotation thereon, a link collar 14 having an integral arm 15, which is connected by link 16 to the switch controller 11. The link 16 carries intermediate its ends a weight 17 which furnishes a constant tendency for the controller 11 to fall to its down position for shutting off the motor and stopping the flow.

The means for turning the switch on is obtained by connections to the dispensing hose 6 and comprises a chain or cable 18 fastened to link 16 at 19 and guided against kinking through a piece of pipe 20 and outwardly of the casing 1 between guide rollers 21 for being fastened to a swinging rod 22. The rod 22 is hung on a universal joint pivot 23 from a stationary part of casing 1 and said rod extends in parallel relation to the initial part of the hose 6 and is guided in this relation by a ferrule clamp 24 secured to the hose. In this manner any swinging movement of this part of the hose from its inert down hung position as will occur when any other part of the hose is pulled, will swing the rod 22 and lift the controller 11 to turn on the motor and start the flow. Obviously when such hose pull is relaxed the switch 10 will automatically turn off.

A suitable register indicator is provided for the pump and as shown generally in Fig. 1 is indicated at 24 with dials at 25' for indicating gallons of liquid dispensed, dials at 26' for indicating the cost of the same in money value and dials at 27 to show a posted price per gallon. The register 24 is driven in the usual manner from the flow meter 5 through a driving shaft 28. The usual reset mechanism for zeroizing the indicator is not shown in detail since such mechanisms are well known. The operating crank for said reset mechanism is at 25 and is connected to a reset shaft 26 which extends across the pump casing for being coupled to a cam collar 27 having bearings in the bracket 13, (see Figs. 6, 7, 9). It will be understood that a complete rotation of said crank 25 will zeroize the register, and that in this operation said cam collar 27 will also be rotated.

Figure 3:
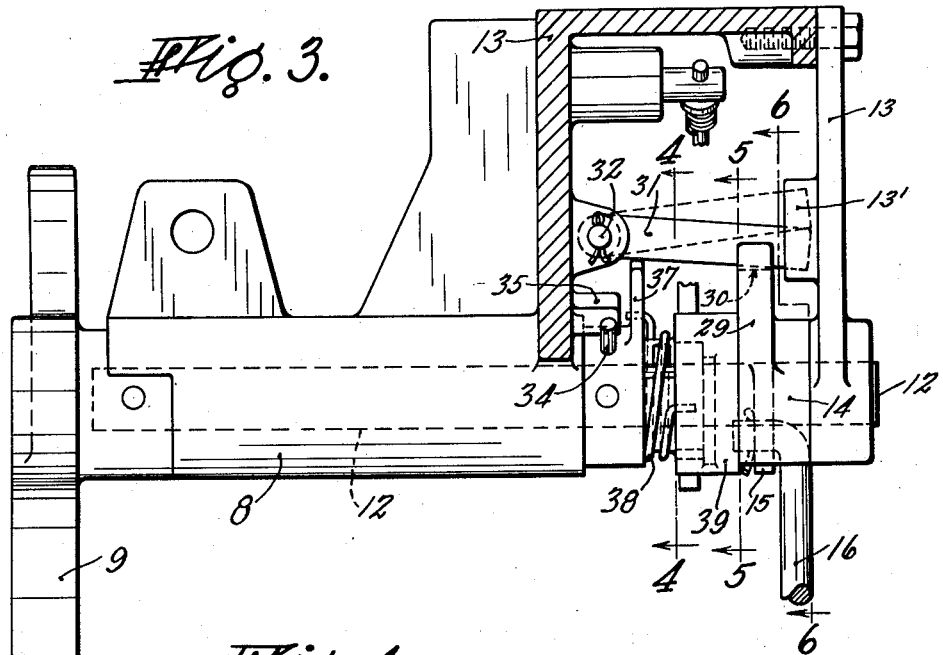
Fig. 3 is a detail view (full size) showing the manual control handle and the mechanism associated therewith.

By means of the construction so far described the control of the motor and pump 2 is placed with the hose pull, and it is desirable to provide additional control means for blocking and unblocking said hose pull control. Referring to Figs. 3, 6, and 7, the link collar 14 connected with link 16 and loosely mounted on the spindle 12, has integral therewith a segment 29 with a locking notch 30 formed in its peripheral surface. A blocking member or locking dog 31 pivoted at 32 on the bracket 13 is adapted to drop into said notch 30 and lock the latter against rocking movement whenever said collar 14 is in its position corresponding to the off position of said motor switch 10. Obviously when such locking occurs the hose pull control is no longer effective for operating the switch 10. The free outer end of the dog 31 slides along a vertical flange 13' of bracket 13 so as to resist lateral strain.

The manual control handle 9 in one form of my invention is employed to unlock the hose pull control when desired and for this purpose has an on and off position as indicated in the figures. Coacting stop pins 33, 34 on spindle 12 and stop lugs 35, 36 on bracket 13 limit the rocking movement of handle 9 between its off and on positions. The spindle 12 has fixed thereto a lifting cam member 37 adapted to work beneath the blocking member 31 so that when said handle 9 is in its off position the cam 37 permits blocking member 31 to drop into its locking notch 30 and when said handle 9 is in its on position the cam 37 lifts said blocking member 31 out of the notch 30. A spring may be employed if desired to impart downward swinging movement to the dog or blocking member 31.

Figure 4:
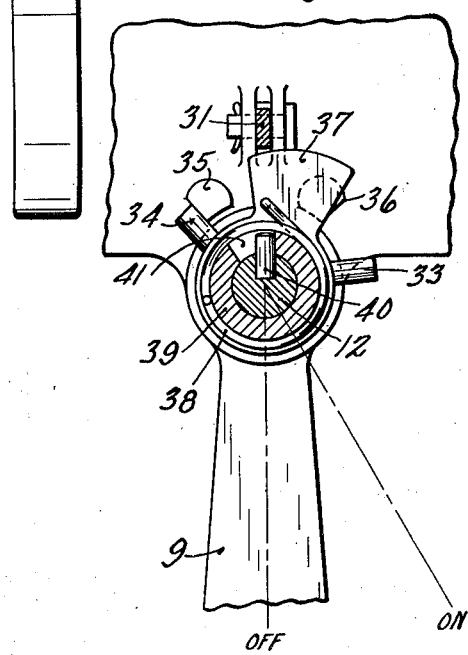
Fig. 4 is a detail section along line 4—4 of Fig. 3.

The handle 9 may be rocked at will and under all conditions from its off to its on position to unblock the operation of the hose pull control. However, a spring 38 is provided which under certain conditions yieldingly tends to hold or return handle 9 to its off position and render the blocking member 31 active. As shown in Fig. 3 this spring 38 is coiled about the spindle 12 and has one end fastened to the cam member 37 (fixed to spindle 12) and its other end fixed to a spring anchor collar 39. The anchor collar 39 is mounted loose for a limited amount of free rotative play on the spindle 12. As shown in Fig. 4 a pin 40 fixed in spindle 12 extends within a segmental slot 41 in said anchor collar 39 to limit this amount of free play between collar 39 and spindle 12. The tension of coil spring 38 is such that it yieldingly tends to make collar 39 follow each rotative movement of spindle 12 from off to on position, but if the collar 39 is restrained from this follow up movement then spring 38 is put under further tension by an on movement of spindle 12 and handle 9, which tension tends to return the handle 9 and spindle 12 to the off position as shown in Fig. 4. Obviously if the spring anchor collar 39 is not restrained from its follow up movement with an on turning movement of spindle 12 then there is no spring tension tending to return said spindle 12 and handle 9 to its off position. In other words under such conditions the return tension of the spring 38 is nullified.

The means for preventing or permitting the spring anchor collar 39 from partaking of the follow up movement just described comprises an interlock mechanism between this collar 39 and the reset mechanism of the register. The function of this interlock mechanism is such that if the reset crank 25 is rotated to zeroize the register before the handle 9 is turned to on position then the anchor collar 39 is free to follow up the spindle 12 and nullify the return tension of spring 38, but if said zeroizing operation is not previously performed, then the collar is restrained from said follow up movement and the spring 38 is placed under tension tending to return the handle 9 to its off position. However, handle 9 may be turned to and held in its on position by hand against the tension of spring 38 under such circumstances but the moment the operator lets go handle 9 it will be returned to off position by said spring 38.

The interlock mechanism above referred to will now be described with particular reference to Figs. 6 and 7. Pivotally mounted on stud 42 projecting from the bracket 13 is a two-armed locking beam 43. One end 44 of said locking beam is adapted to work against a peripheral surface of said anchor collar 39 and to drop into a locking notch 45 thereof and thereby stop the anticlockwise or follow up movement of collar 39 when the handle 9 is turned on. The other end 46 of said beam 43 is adapted to work against the peripheral surface of the reset shaft collar 27 and to drop into locking notch 47 thereof for preventing rotation of said reset shaft in either direction. It will be observed that when the end 44 is in its locking notch 45 the other end 46 is out of its locking notch 47 and vice versa. When the handle 9 is in off position with the locking notch 45 of collar 39 opposite end 44 of the locking beam the other end 46 of said locking beam will not positively lock the reset shaft collar 27 from an anti-clockwise movement for resetting because a little extra manual force upon said reset shaft 26 will cause the end 46 to ride out of said notch 47. However, when the handle 9 and its follow-up collar are both in on position and the end 46 is in its locking notch 47 the other end 44 of said beam 43 will be abutting the peripheral surface of said collar 39 in such manner as to prevent withdrawal of locking end 46 from its notch 47, and under these circumstances the reset shaft will be positively locked against rotation. The above construction provides that the reset shaft cannot be operated to zeroize the register when the handle 9 is in on position and the follow-up movement of collar 39 has taken place to relax the spring 38. If, however, it is desirable to permit rotation of the reset shaft in zeroizing at any time, that is irrespective of the position of collar 39, then the reset shaft collar 27 will have no locking notch such as 47 and the end 46 will be made so as to ride at all times against a smooth peripheral surface of such a collar 27.

Figure 5:
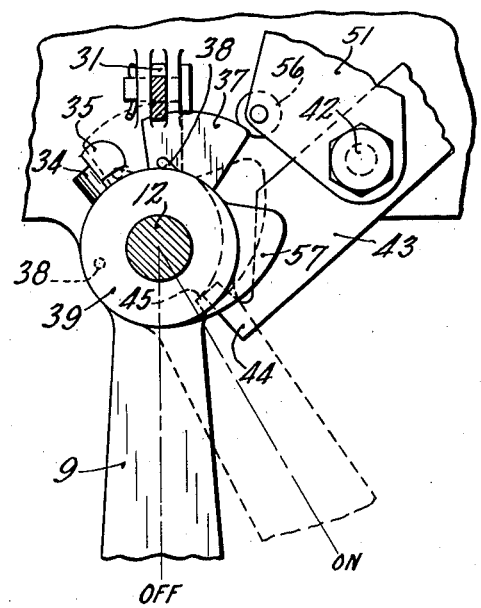
Fig. 5 is a detail section along line 5—5 of Fig. 3.

The means for shifting and holding the locking beam 43 into its two different positions as shown in Figs. 6 and 7 comprises a loading spring 48 mounted on a toggle rod 49, one end of which rod is pivotally connected at 50 to a toggle plate 51 and the other end of which rod slides through a rocking pivot stud 52 extended from the bracket 13. The spring 48 is interposed under compressed tension between said pivot stud 52 and a shoulder 53 on said rod 49. The toggle plate 51 is a bifurcated member straddling the beam 43 and pivoted at its lower end on the stud 42. Between the side members of said toggle plate 51 are carried studs or rollers 54, 55 and 56. The anchor collar 39 is formed with an integral cam portion 57 (see Fig. 5), which is in a plane at one side of the beam 43 and in a plane so as to work against roller 56 for acting against the latter. Similarly the reset shaft collar 27 has an integral cam portion 58 adapted to work against the rollers 54 and 55 of the toggle plate 51.

With the parts in the position shown in Fig. 6 the roller 54 bears downwardly against a shoulder 59 of said beam 43 and under the force of the toggle spring 48 has rocked said beam 43 to bring its end 44 into locking relation with the collar 39. In this condition a rotation of the reset shaft 26 and the collar 27 in the direction of the arrow for zeroizing the register will cause cam 58 to bear against roller 55 and throw the toggle to its other position shown in Fig. 7 wherein the roller 56 will bear against a shoulder 60 of said beam 43 and rock said beam out of locking relation with collar 39 and into locking relation with collar 27. In this position of the parts as shown in Fig. 7 when the handle 9 is turned to on position the follow-up collar 39 and its cam 57 will be carried against the roller 56 and throw the toggle 49, 51 back to the position shown in Fig. 6. The beam 43 will then be under the pressure of said toggle to spring into locking relation with the collar 39 as soon as said handle 9 and collar 39 are again returned to off position to bring notch 45 of collar 39 under the end 44 of said beam 43.

Figure 9:
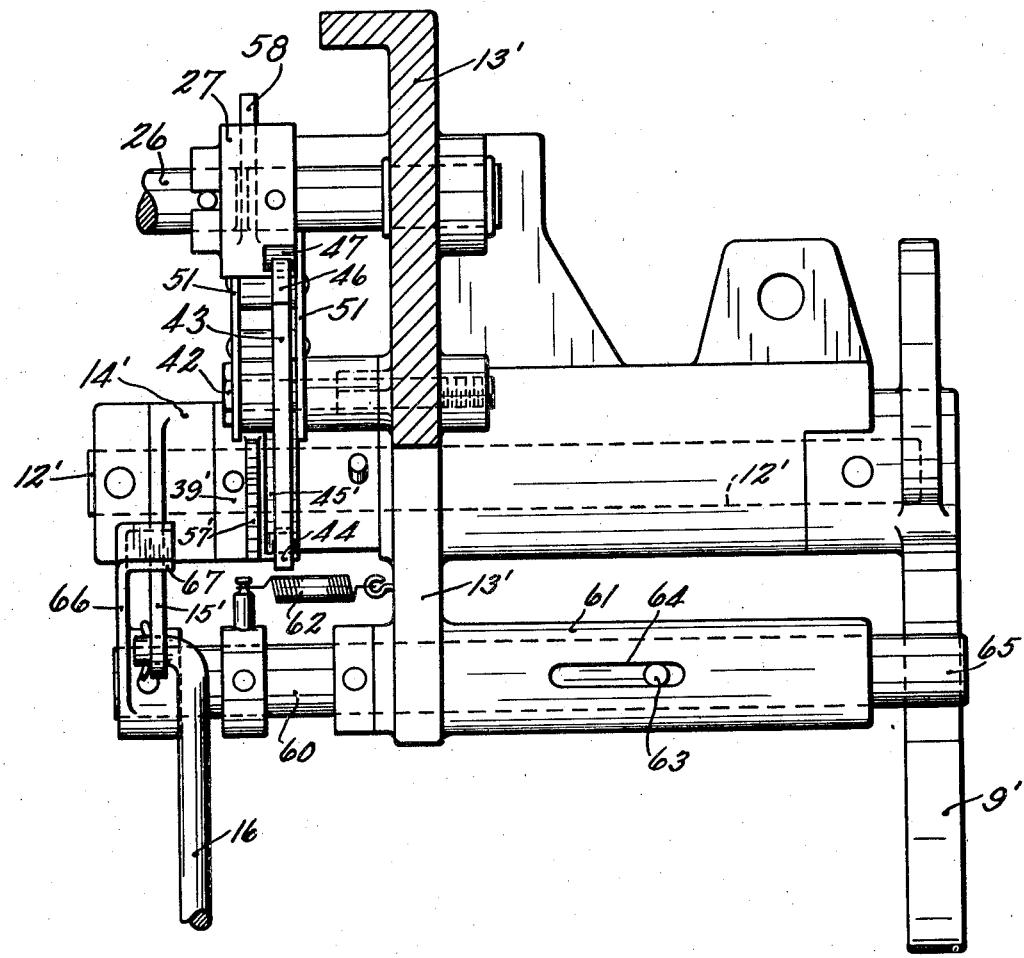
Fig. 9 is a view of said modification along the section line 9—9 of Fig. 8 looking in the direction of arrows.

Referring now to Figs. 8 and 9 which show a modified form of blocking and unblocking means for the hose pull control it will be understood that all of the connections between the hose pull and the motor switch are the same as previously described. In this form, however, the link collar 14' while provided with its integral arm 15' for connection to link 16 is not formed with any locking notch segment such as 29 in the previous form described. The said link collar 14' is not fixed to but free to rock upon the outer end of handle spindle 12 as previously described, and is blocked from said free rotation in a somewhat different manner than that previously described. Plunger 60 is mounted for slidable nonrotative movement in a tubular casing 61 projecting from a modified form of bracket 13'. The plunger 60 is provided with a spring 62 connected thereto and to the bracket 13' tending to keep said plunger 60 in its out or projecting position with respect to the pump casing. A pin 63 on said plunger working in a slot 64 in tubular casing 61 limits the sliding movement of said plunger 60 and the outer protruding end 65 of said plunger is adapted like a push button to be pushed in by the thumb or hand of the operator. The inner or rear end of said plunger 60 carries fixed thereto a blocking member 66 having a hook portion 67 arranged for engaging behind the link arm 15' for blocking the upward movement of said arm, and consequently the on movement of the motor switch.

It will be obvious that when the plunger end 65 is pushed in (to the left as shown in Fig. 9) the blocking member 66 will be carried out of the path or into unblocking relation with said link arm 15' and thus free the same for operation and control by the hose pull as previously described. The plunger 60 may be held in this unblocking position by hand against the tension of the spring 62, but if said plunger is not held to its inward position it will immediately slide out under the force of spring 62 for taking its blocking relation with respect to said link arm 15'.

The manual control handle 9' is provided so as to have an off and on movement as previously described with respect to handle 9 and the relation of the plunger end 65 and said handle 9' is such that when the plunger 65 is pushed in the handle 9' may be swung over to on position on top of said plunger to hold it in and thus keep the hose pull control unblocked as long as said handle 9' is in said on position.

The movement of the manual control handle 9' from off to on position in this form of my invention is made conditional upon having previously operated the reset mechanism for zeroizing the register. The same form of interlock mechanism as previously described is therefore provided to act between the reset shaft 26 and the handle spindle 12'. Fixed in permanent relation to said handle spindle 12' is a collar 39' which has integral therewith a cam 57' and locking notch 45' in all respects like the cam 57 and locking notch 45 of cam collar 39 previously described. The cam collar 39' thus fixed to the handle spindle 12' works with relation to the interlock mechanism in precisely the same manner as previously described with respect to the spring anchored collar 39. Therefore it will not be necessary to repeat the description of this cooperative action.

A résumé of the functional operation of the above described apparatus is as follows: The attendant in starting a dispensing operation should first rotate the crank 25 of the reset mechanism to zeroize the register. This operation through reset shaft collar 27 will actuate the interlock mechanism so as to unlock and free the spring anchor collar 39 whereby when the manual control handle 9 is thereafter turned from off to on position it will remain in this position without tendency to return to off position. The turning of the handle 9 to on position will through its cam 37 lift the blocking member 31 out of the locking notch 30 where it will there be held until the handle 9 is returned to off position. The hose pull control will then be free to operate the motor switch 10 at the will of the operator for dispensing gasoline to a customer. In the before described operation, if the attendant failed to first operate the resetting crank 25 he would then find that the handle 9 when turned to on position would have a tendency to return to its off position under the tension of the spring 38 the returning effect of which has not been nullified by the operation of the reset mechanism. This returning tension of spring 38 would warn the attendant that he should reset the register if he desires to leave the handle 9 in on position without holding it there by hand.

In the form of construction shown in Figs. 8 and 9, the attendant for a proper operation in dispensing first revolves the reset crank as described and then pushes in the plunger 65 to move the blocking member 66 out of bolcking relation against the tension of spring 62. This action will release the hose pull control so as to be operated at will, but unless the attendant keeps the plunger 65 pressed inwardly by hand it will return to its outward position to again block the hose pull control. In order to retain the plunger 65 in its inward unblocking position the attendant moves the control handle 9' over on top of said plunger 65 to latch it in its inward position. The handle 9', however, can be turned to its said latching position only when the reset crank has been previously operated as described so as to cause the interlock mechanism to free said handle 9'. If said reset crank 25 has not been previously operated then the handle 9' cannot be turned away from its off position and the attendant in order to keep the hose pull control unblocked will have to keep the plunger 65 pushed inwardly by hand.

I claim:

1. In liquid dispensing apparatus having flow establishing means, a meter register operating in accordance with said flow for indicating the quantity of liquid dispensed at each dispensing operation and reset mechanism for zeroizing said register, a controller for said flow establishing means, a movable dispensing hose having connections with said controller whereby when said hose is pulled the flow may be started and when the pull on the hose is relaxed the flow will be stopped, the combination therewith, of blocking means for preventing the start of flow by said hose pull, said blocking means being movable at the will of the operator to unblocking position so as to permit start of flow by said hose pull, automatic means tending to effect the return of said blocking means to its blocking position, and means rendered operative by a zeroizing action of said reset mechanism for nullifying the tendency of said automatic means.

2. In liquid dispensing apparatus having flow establishing means, a meter register operating in accordance with said flow for indicating the quantity of liquid dispensed at each dispensing operation and reset mechanism for zeroizing said register, a controller for said flow establishing means, a movable dispensing hose having connections with said controller whereby when said hose is pulled the flow may be started and when the pull on the hose is relaxed the flow will be stopped, the combination therewith, of blocking means for preventing the start of flow by said hose pull, said blocking means being movable at the will of the operator to unblocking position so as to permit start of flow by said hose pull, automatic means tending to effect the return of said blocking means to its blocking position, and means for rendering said automatic means inoperative when said reset mechanism is operated to zeroize said register.

3. In liquid dispensing apparatus having flow establishing means, a meter register operating in accordance with said flow for indicating the quantity of liquid dispensed at each dispensing operation and reset mechanism for zeroizing said register, a controller for said flow establishing means, a movable dispensing hose having connections with said controller whereby when said hose is pulled the flow may be started and when the pull on the hose is relaxed the flow will be stopped, the combination therewith, of blocking means for preventing the start of flow by said hose pull, said blocking means being movable at the will of the operator to unblocking position so as to permit start of flow by said hose pull, automatic means tending to effect the return of said blocking means to its blocking position, and means rendered operative by a zeroizing action of said reset mechanism for preventing the automatic return of said blocking means to its blocking position.

4. In liquid dispensing apparatus having flow establishing means, a meter register operating in accordance with said flow for indicating the quantity of liquid dispensed at each dispensing operation and reset mechanism for zeroizing said register, a controller for said flow establishing means, a movable dispensing hose having connections with said controller whereby when said hose is pulled the flow may be started and when the pull on the hose is relaxed the flow will be stopped, the combination therewith, of a blocking member normally tending to move into position for blocking the action of said hose pull in starting a flow, retaining means comprising a manual control handle for holding said blocking member in unblocking position, and interlock mechanism between said retaining means and said reset mechanism serving to release said retaining means for action only when said reset mechanism is operated to zeroize said register.

5. In liquid dispensing apparatus having flow establishing means, a meter register operating in accordance with said flow for indicating the quantity of liquid dispensed at each dispensing operation and reset mechanism for zeroizing said register, a controller for said flow establishing means, a movable dispensing hose having connections with said controller whereby when said hose is pulled the flow may be started and when the pull on the hose is relaxed the flow will be stopped, the combination therewith, of a blocking member normally tending to move into position for blocking the action of said hose pull in starting a flow and movable at the will of the operator into unblocking position so as to permit start of flow by said hose pull, a manual control handle movable into position for holding said blocking member in its unblocking position, and interlock mechanism between said control handle and said reset mechanism serving to permit movement of said control handle into holding position only when said reset mechanism is operated to zeroize said register.

6. In liquid dispensing apparatus having flow establishing means, a meter register operating in accordance with said flow for indicating the quantity of liquid dispensed at each dispensing operation and reset mechanism for zeroizing said register, a controller for said flow establishing means, a movable dispensing hose having connections with said controller whereby when said hose is pulled the flow may be started and when the pull on the hose is relaxed the flow will be stopped, the combination therewith, of a blocking member normally tending to move into position for blocking the action of said hose pull in starting a flow, a manual control handle having means associated therewith for moving said blocking member to unblocking position, a spring tending to move said control handle into position to release said blocking member for movement into its blocking position, and means actuated by the operation of said reset mechanism in zeroizing said register to nullify the action of said spring.

7. In liquid dispensing apparatus having flow establishing means, a meter register operating in accordance with said flow for indicating the quantity of liquid dispensed at each dispensing operation and reset mechanism for zeroizing said register, a controller for said flow establishing means, a movable dispensing hose having connections with said controller whereby when said hose is pulled the flow may be started and when the pull on the hose is relaxed the flow will be stopped, the combination therewith of a blocking member movable into position for preventing the start of flow by said hose pull, means operable at the will of the operator to move said blocking member into its unblocking position so as to permit start of flow by said hose pull, a return spring tending to effect the return of said blocking member to its blocking position, and means rendered operative by a zeroizing action of said reset mechanism for nullifying the tendency of said return spring.

8. In liquid dispensing apparatus having flow establishing means, a meter register operating in accordance with said flow for indicating the quantity of liquid dispensed at each dispensing operation and reset mechanism for zeroizing said register, a controller for said flow establishing means, a movable dispensing hose having connections with said controller whereby when said hose is pulled the flow may be started and when the pull on the hose is relaxed the flow will be stopped, the combination therewith of a blocking member for said hose pull, manually operative means to render said blocking member ineffective, a spring having a return action tending to render said blocking member effective, and means rendered operative by the zeroizing action of said reset mechanism for nullifying the return action of said spring.

JOSEPH A. LOGAN.